STORAGE DEVICE FOR USE IN TELEPRINTERS

Filed May 17, 1966 5 Sheets-Sheet 1

INVENTORS.
JOHANN AUGUSTIN
JOACHIM WENGER
MANFRED REICHARDT
EWALD SPIEGLER
ATTORNEY

STORAGE DEVICE FOR USE IN TELEPRINTERS

Filed May 17, 1966

INVENTORS
JOHANN AUGUSTIN
JOACHIM WENGER
MANFRED REICHARDT
EWALD SPIEGLER

BY

ATTORNEY

STORAGE DEVICE FOR USE IN TELEPRINTERS

Filed May 17, 1966 5 Sheets-Sheet 3

INVENTORS
JOHANN AUGUSTIN
JOACHIM WENGER
MANFRED REICHARDT
EWALD SPIEGLER

BY Percy P. Lantzy
ATTORNEY

STORAGE DEVICE FOR USE IN TELEPRINTERS

Filed May 17, 1966 5 Sheets-Sheet 4

INVENTORS
JOHANN AUGUSTIN
JOACHIM WENGER
MANFRED REICHARDT
EWALD SPIEGLER

BY Percy P. Lantzy
ATTORNEY

Aug. 5, 1969 J. AUGUSTIN ET AL 3,459,890

STORAGE DEVICE FOR USE IN TELEPRINTERS

Filed May 17, 1966 5 Sheets-Sheet 5

INVENTORS
JOHANN AUGUSTIN
JOACHIM WENGER
MANFRED REICHARDT
EWALD SPIEGLER

BY Percy P. Lantzy

ATTORNEY

United States Patent Office 3,459,890

Patented Aug. 5, 1969

3,459,890
STORAGE DEVICE FOR USE IN TELEPRINTERS

Johann Augustin, Joachim Wenger, Manfred Reichardt, and Ewald Spiegler, Pforzheim, Germany, assignors to International Standard Electric Corporation, New York, N.Y., a corporation of Delaware Filed May 17, 1966, Ser. No. 550,803
Claims priority, application Germany, May 20, 1965, St 23,853
Int. Cl. H04l *15/00, 17/16*
U.S. Cl. 178—17 20 Claims

ABSTRACT OF THE DISCLOSURE

A teleprinter signal storage device for effecting automatic insertion of case shift signals, the storage capacity of which is independent of the number of said case shift signals. The storage device comprises a rotatable storage drum on which is provided paraxial rows of radially adjustable storage studs and which rotates in a stepped manner relative to the rhythm of the input, and a touching device, detachably coupled to the drum and urged to rotate in opposition thereto relative to the rhythm of the transmitter, the touching device including a plurality of storage contacts which are arranged in series with the transmitting contacts, and mounted on a shaft running axially through the drum so as to be in alignment with corresponding storage studs. The transmitter-controlled rearward rotation of the touching device is effected each time in two partial steps of a half drum stepping division, the first being performed during transmission of the telegraphic code start element while the second is performed during the stop element. The first partial step is concerned with case shift identification and the latter with character identification.

The present invention relates to a storage device for the use in printing telegraph apparatus operating according to the five-unit telegraph code, having a storage capacity which is independent of the automatically inserted case or type group shift signals, consisting of a storage drum provided with paraxial rows of storage studs serving to store-in the code signals, and which are adjustable in the radial direction, with the said storage drum being turned in a step-by-step manner in the rhythm of the input, and further consisting of a touching device which is being moved in the opposite direction and in the rhythm of the transmitter.

Owing to the double exploitation of the five-unit code which is possible when employing the international telegraphic alphabet, it is necessary to let the characters, which are subdivided into two cases or type groups, be preceded by a so-called case (type group) shift signal when changing from the one case or group to the other. In the case of the normal quantity-produced teletypewriting machines, the insertion of these function text characters by way of manually actuating special keys. This necessity, however, renders the writing operation with a teleprinter more difficult, and requires a certain training of the operator. Moreover, with respect to these types of teleprinters, when being operated at a normal telegraphic speed (speed of transmission) of about 50 to 75 bauds, the momentary keyboard lock, which is due to the transmission process, has a disadvantageous effect, so that there is only possible a writing rhythm which is adapted to the rhythm of transmission and to which, in turn, also the operator has to adapt herself. For these reasons various types of storage devices for teleprinters have already been proposed with the aid of which an automatic insertion of the case shift signals can be carried out, and which permits a more individual way of writing on account of providing the possibility of an intermediate storng, which is independent of the transmitting rhythm.

In common to all of these devices which have become known up to date, is the disadvantage that they require a high expenditure on complicated mechanims which are rather susceptible to trouble or interference, and that the case shift signals are fed in a genuine manner into the storage unit. The latter is of disadvantage in so far as the storage capacity for characters is reduced by the number of inserted case shift signals. More decisive, however, is that by the genuine storing-in of these function signals there either becomes necessary a correspondingly longer locking of the keyboard, or that the storage unit, which is mostly designed in a drum shaped fashion, and in the case of an insertion of a case shift signal, must be stepped-on twice during the available period of time. The last mentioned possibility, however, is hardly applicable anymore in view of the high operating speeds which are customary nowadays, and the high accelerations appearing in the course thereof and, in addition thereto, cause an unnecessary wear of the material which is in most cases also connected to a noise production which should be possibly avoided.

Then genuine storing-in of the case shift signals is merely avoided by a storage device as described in the German Patent No. 968,980. According to this patent it is proposed that together with each character there is fed-in an identification marking the respective case and which only, in the case of a shift, causes an interruption of the sensing process by simultaneously releasing or tripping a code disc associated with the case shift signal.

This conventional arrangement, however, requires a voluminous and complicated mechanism which, in addition thereto, and on account of the stored characters which are to be sensed or scanner in series, calls for a high precision standard in order to guarantee an unobjectable transmission.

All of these disadvantages of conventional types of storage devices are now avoided by the arrangement according to the present invention. Its main feature resides in the fact that the touching device consists of storing contacts arranged in series with the transmitting contacts and which, in alignment with the storage studs, are rotatably arranged inside the storage drum, i.e. capable of rotating about the centre axis thereof.

In further embodying this feature, the present invention is still characterised by the fact that each row of storage studs comprises additional studs via which there is effected the storing-in of a case shift identification, that the associated touching contacts are advancingly staggered by half a step division with respect to the other contacts and, in the event of an actuation, have an influencing effect upon both the touching process and the touching contacts in a way adjusting or setting the case shift signal. On account of these steps and arrangement there is provided a storage device which is substantially simplified from the machinancial point of view, and whose capacity is independent of the number of automatically inserted case shift signals.

The invention will now be explained in detail with reference to an example of embodiment and in connection with the copending drawings.

Figure 1:
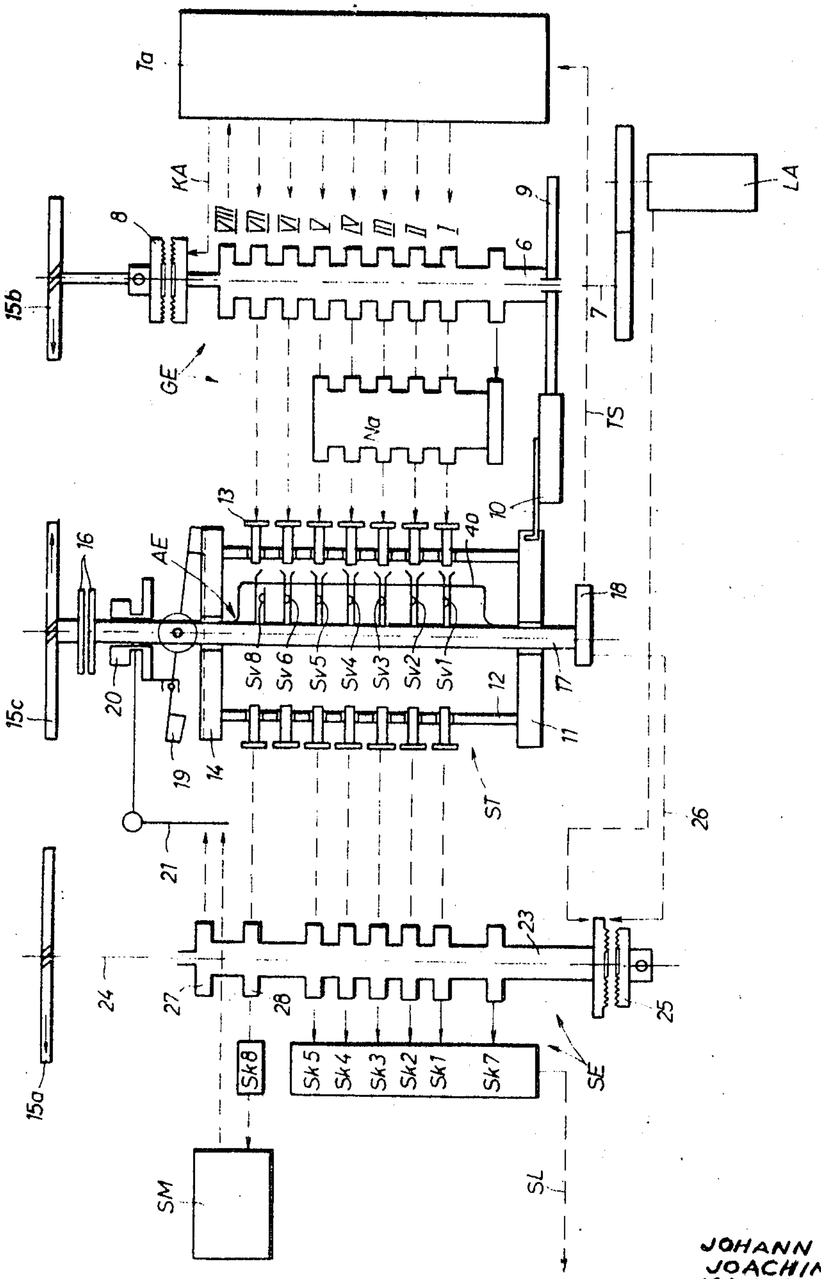
FIG. 1 shows in a schematic representation the co-operation of the storage device according to the invention both with the connected setting device and the transmitting equipment.

First of all both the construction and the fundamental mode of operation of the storage device, according to the present invention, shall be explained with reference to FIGS. 1 and 2.

The mechanical setting device GE is acted upon in accordance with code by the key-controlled input via the keyboard T*a*. At the same time, and via the setting clutch control mechanism KA, there is effected the throwing of the setting clutch 8, by which the setting cam set 6 is coupled for one rotation to the setting shaft 7. This setting shaft 7 is permanently driven via the toothed wheel 15*b*, and rotates at a rate of speed which is at least 10% higher than that of transmitter shaft 24 of the transmitting equipment SE. Upon starting of the rotation of the cam set 6, and via the keyboard locking cam 6/VIII, the keyboard is locked in the manner known per se for the time of the rotation, during which time, via the setting cams to code bars 6/I–V, the character to be transmitted and, via the setting cams to case shift bars 6/VI and VII, the case identification, in cases where necessary, are fed parallel, via the storage studs 13, into the storage drum ST. The answer-back device N*a* operates in the same way as the setting device GE upon the drum ST and will, therefore, not be described in detail herein.

After the effected storing-in of one character, the storage drum ST is stepped on by one division in the anticlockwise direction. To this end the storage drum is provided at its one face side with a Maltese cross 11, the associated pin wheel 10 of which is being driven via a toothed wheel 9 forming one unit with the setting cam set 6.

The touching device AE is in detachable connection with the other face side of the storage drum designed as a toothed wheel rim 14, via a trip seesaw 19, but at the same time also via the drive wheel of the touching device 15*c*, by the intermediate insection of a friction clutch 16 which is under the effect of a driving system operating in opposition to the transmission shaft of the storage drum, and which continuously rotates at a higher speed of rotation with respect to the transmitter shaft, caused by a corresponding transmission gear.

The touching device AE consists of a hollow shaft 17 extending in the axial direction through the storage drum ST, with storage contacts S*v*1 to S*v*6 and S*v*8 being firmly arranged thereon in alignment with the storage studs 13 by being insulated from one another, with the said storage contacts S*v*6 and S*v*8 being advancingly staggered by half a drum pitch or division with respect to the contacts S*v*1 to S*v*5. In the initial condition of each scanning or touching cycle these two contacts are directly in opposition to the associated storage studs 13, whereas the remaining contacts S*v*1 to S*v*5 assume a corresponding intermediate position, in which they remain unaffected. The storage contacts S*v*1 to S*v*6 are designed as normally closed contacts, whereas the storage contact S*v*8 is a normally open contact. Both the contacts S*v*6 and S*v*8 serve to interrogate a fed-in case identification, and also serve the tripping of the automatic insertion of a corresponding case shift signal, with the contact S*v*6, for the purpose of forming the combination "figures" being arranged in series with the storage contact S*v*3 (FIG. 5), whereas the storage contact S*v*8 is arranged in series with the contact S*k*8 and, upon actuation, selects a locking magnet SM (FIG. 5) which, for the time of the transmission of the inserted case shift signal, prevents a relative movement between the storage drum ST and the touching device AE by blocking the mechanism 19 through 21.

Figure 5:
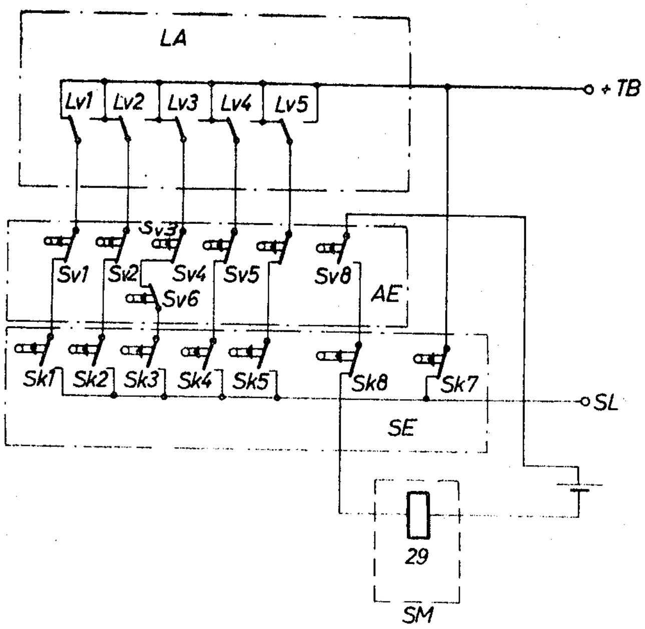
FIG. 5 shows a circuit diagram explaining the electrical correlations with respect to the storage device according to the present invention.

All of the connected or lead-in wires extending to and from the storage contacts S*v*1 to S*v*5 and S*v*8 are led to the outside through the hollow shaft 17 of the touching device, and are connected, in accordance with FIG. 5, in series with the associated transmitting contacts S*k*1 to S*k*5 or S*k*8 respectively, with the storage contact S*v*6, as already described hereinbefore, being interconnected between the series connection of the contacts S*v*3 and S*k*3. Both the transmitting contacts S*k*1 to S*k*5, as well as the start-stop transmitting contact S*k*7, merely have a timing function, and are actuated one-at-a-time in turn via the transmitter cam set 23, which is designed in the conventional manner, for effecting the series-wise transmission of the respective character to the transmitting line SL.

As already mentioned hereinbefore, the storage drum ST, after having performed the storing-in of a character, is caused to perform a partial rotation via the setting device GE. On account of the mechanical connection 14, 19, existing between the storage drum ST and the touching device AE, the latter is taken along by the drum. By this rotation it is effected that the locking member 18 (FIG. 2) forming one unit with a touching device AE, releases the transmitter clutch 25, so that the transmitter cam set 23 is coupled to the transmitter shaft 24 which is permanently driven via the drive wheel 15*a*.

If now, for example, the two storage contacts S*v*6 and S*v*8, in the normal position of the touching device, or at the beginning of each touch cycle respectively, in which they are in a position directly opposite their associated studs 13, are actuated by the latter on account of a case identification, e.g. "figures" which has been stored-in together with the code signal, then the contact S*v*6 will be opened, and thus interrupts the circuit extending to the transmitting contacts S*k*3 (FIG. 5). Since in this position of the touching device AE, however, basically all storage contacts S*v*1 through S*v*5 are closed, there is effected a presetting of the code combination (++−++) characterising the case shift signal "figures," with this presetting having been effected by the storage contacts S*v*1 through S*v*6. Simultaneously with the opening of the storage contact S*v*6, however, there is also closed the storage contact S*v*8.

Figure 2:
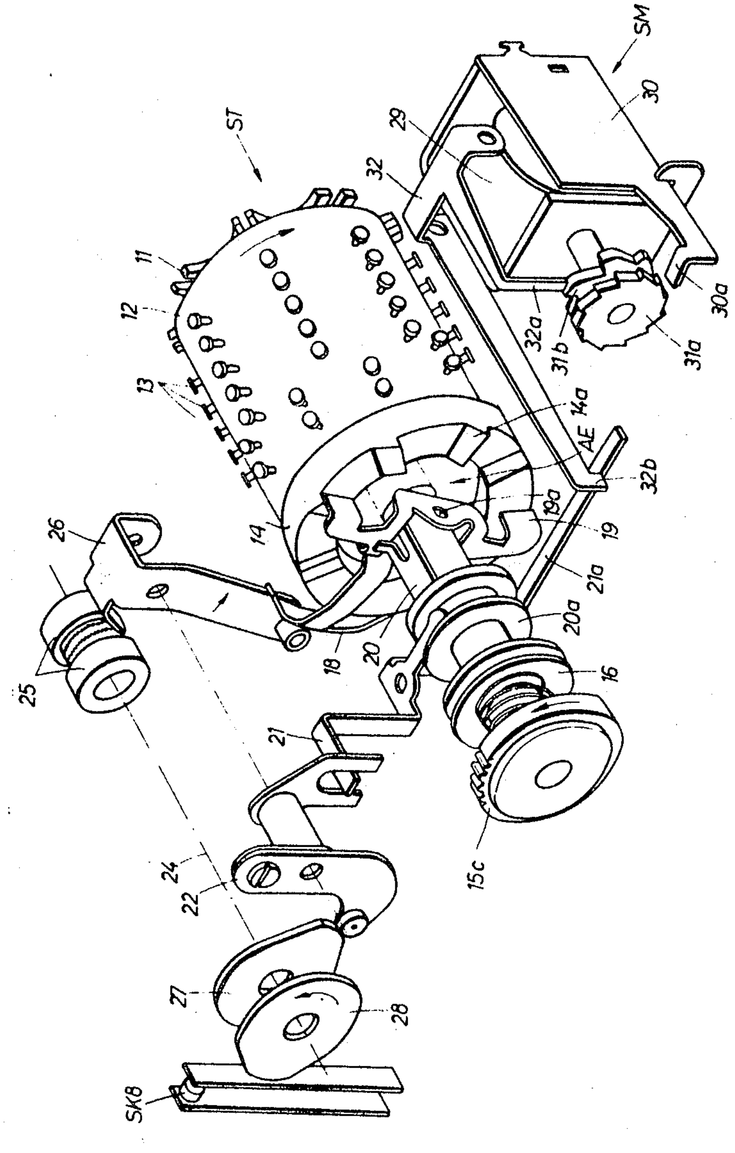
FIG. 2 shows in a perspective representation the storing device according to the invention, including both the driving and the controlling mechanism of the touching device.

FIG. 2 refers in detail to the mechanical embodiment of the storage drum ST, of the coupling or clutch mechanism 14, 19 between the storage drum ST and the touching device AE and the driving system thereof, which is effected via the drive wheel 15*c*, and the friction clutch 16, as well as of the controlling or selecting of the transmitter clutch 25/26 which is effected via the locking member 18 of the touching device AE, and of the mechanical or electrical controlling of the trip seesaw 19 and the locking magnet SM which is effected via the cams 27 and 28 forming part of the transmitter cam set 23.

In proceeding from the shown normal position of the storage device, in which the touching device AE, in its normal position, via the locking member 18, and by actuating the clutch resetting lever 26, keeps the transmitter clutch 25 out of engagement, and based on the previously mentioned assumption that together with the first stored character there has been fed-in the case identification "figures" by the depression of the two storage studs 13, there are actuated in the manner described hereinbefore, the contacts S*v*6 and S*v*8 in the moment of storing-in. Since the storage drum ST at this particular time position, has not yet started to perform a partial rotation, hence since the transmitter cam set is still in its shown normal position, there is also still closed the contact S*k*8 which is controlled via the contact camplate 28, so that in accordance with the showing of FIG. 5 the toroidal coil 29 of the locking maget SM is energized, The armature 30 is accordingly attracted and actuates via its pawl-shaped extension 30*a*, a step-wheel 31*a*. Firmly connected to this step-wheel is a control wheel 31*b*, which is toothed in such a way that the controlling arm 32*a* of a locking lever 32, extending from the shown normal position, and after one stepping operation, will engage between two teeth and, at a repeated stepping operation, is again lifted out by a subsequently following tooth, and that in the first switching position the snug 32*b* of the locking lever 32 will engage behind the extended arm 21*a* of a connecting lever 21 and, in the second position, characterising the starting position, releases the arm 21*a*. In the present case the locking lever 32 has engaged in the course of the solitary stepping operation, and has placed itself with its snug 32*b* behind the arm 21*a*.

By the partial rotation of the storage drum in the direction as indicated by the arrow, and as now effected by the toothed wheel 9, via the Maltese cross transmission 10, 11, a new row of storage studs is brought into the range of action of the setting levers 5/I–VII (FIGS 3 and 4) for effecting the storing-in. Since, however, and as already mentioned hereinbefore, the touching device AE, via a stepping clutch consisting of a toothed wheel rim 14 forming part of the storage unit ST, with axially directed teeth 14*a*, and a trip seesaw 19 firmly connected to the touching device via a pivot pin 19*a*, is coupled in a force locking manner to the storage drum ST by the action of the drive system operating in the opposite direction, the touching device is caused to perform the partial rotation of the storage drum as well. On account of this the resetting lever 26, which is under the effect of a not shown spring, is released by the locking member 18 and is caused to swivel out in the direction as indicated by the arrow, so that the transmitter clutch members 25 become engaged, and the transmitter cam set 23 now starts to rotate. During the period of time until the start-element is being transmitted via the transmitting contact S*k*7, there is first of all opened the contact S*k*8, which is controlled by the control camplate 28, which remains in this position until the beginning of the transmission of the stop-element. On account of this the circuit of the locking magnet SM is interrupted, and the armature 30 will drop off. Secondly, immediately after the beginning of the rotation of the cam set 23, the cam lever 22 is released by the camplate 27, with the cam lever 22 following the complete 27 under the action of a not shown spring in the clockwise direction, thus rotating and trying to swivel the connecting lever 21, which is in a positive or form locking connection therewith, in the same sense of direction. This, however, is prevented by the locking lever 32 which was previously thereto brought into the engaging position via the locking magnet SM. In this way the connecting lever 21 is prevented from moving the trip member 20 with which it, via the ring slot 20*a* thereof, is in a form locking engagement, to the left, so that a tilting of the trip seesaw 19 is prevented. The relative position between the storage drum ST and the touching device AE therefore remains to exist for the time duration of the initiated transmission process. On account of this, however, also the requirements are met for the automatic insertion or transmission of the case shift signal which, in the manner as described hereinbefore, has already been previously set in the storage contacts S*v*1 to S*v*6.

Shortly before termination of this transmisison cycle, and as already mentioned hereinbefore, the contact S*k*8 is closed again by the action of the contact camplate 28. Since the relative position between the storage drum ST and the touching device AE has not been changed in the meantime, also the storage contact S*v*8 is still closed, so that the coil of the locking magnet SM is energized anew. By this the control wheel 31*b* is again stepped-on by half a tooth division, so that the locking lever 32 will again be brought into the normal position releasing the extended arm 21*a* of the connecting lever 21.

Since the resetting lever 26, now as before, and due to the coupling of the touching device AE by the storage drum ST, is released by the locking member 18, the transmitter cam set 23, upon termination of its rotation, is not disconnected and, therefore, immediately starts a new transmission cycle without any interruption.

Owing to this, the contact S*k*8 is again opened, so that the armature 30 of the locking magnet SM drops off. At the same time, and as already described hereinbefore, the cam lever 22 is released by the camplate 27 which now succeeds in swivelling the connecting lever 21, so that the trip seesaw 19 is being tilted via the trip member 20. In this way the latter, with its upper arm, is brought out of engagement with the one tooth of the toothed wheel rim 14 but, at the same time, swivels with its lower arm into the range of the axially directed teeth. The trip seesaw 19 is now designed in such a way that its arms, with respect to the division or pitch of the toothed wheel rim 14, are staggered by half a division or pitch, so that the touching device, which is released thereby, and under the action of the friction drive wheel of the touching device 15*c*, 16, is now permitted to perform a rotation which is rearward with respect to the storage drum ST, i.e. by half a pitch or stepping division of the drum. Owing to the rotational speed of the driving toothed wheel 15*c*, which is higher than that of the transmitter shaft, the touching device AE has assumed its new position prior to the termination of the transmission of the start element, in which now the storage contacts S*v*6 and S*v*8 are in an intermediate position and, therefore, reassume their normal position, whereas the remaining storage contacts S*v*1 to S*v*5 are now in a poistion opposite their associated storage studs 13 thus acting upon the latter in accordance with the previously set combination. Due to the series connection of the transmitting contacts S*k*1 to S*k*5 with the storage contacts S*v*1 to S*v*5, there is now effected the transmission of the combination as sensed by the storage contact setting.

Owing to the backward rotation of the touching device AE by half a drum stepping division, and under the condition that the storage drum ST has not been stepped-on in the meantime, which would have been the case if in the meantime a new storing-in had been effected, the resetting lever 26 has again been brought into its previous position by the action of the locking member 18 in which it, upon termination of the current transmission process, again separates the clutch members 25, thus causing the transmitter cam set 23 to come to a standstill. Shortly before this time position, the contact S*k*8 is again closed via the contact cam 28, whereas the camplate 27 effects a pressing back of the cam lever 22. On account of this, and via the connecting lever 21, the trip member 20 is again actuated, so that the trip seesaw 19 is tilted backwards and the touching device AE is again permitted to perform a backward rotation by half a step division at the end of which the storage contacts S*v*6 and S*v*8 will now come into a position opposite their associated storage studs 13, whereas the remaining storage contacts S*v*1 to S*v*5 assume an intermediate position between two rows of storage studs.

In the course of storing-in a character or signal element requiring the insertion of the case signal "letters," only the storage stud associated with the storage contact S*v*8 is actuated by the input of the corresponding identification. In the course of the subsequently following sensing or touching, which is performed in absolutely the same manner as described hereinbefore, there only appears the one difference that by the non-actuated contact S*v*6 the signal as preset in the storage contacts S*v*1 to *S*v5, during the touching operation, consists of mark elements, thus corresponding to the case signal "letters" in the telegraphic alphabet No. 2.

In the course of storing-in a character or signal element belonging to the previously chosen case (type group), there is effected no additional input of a type group or case identification. In these cases the touching commences with the backward rotation of the touching device by half a drum stepping division as initiated via the camplate 27, and by which the storage contacts S*v*1 to S*v*5 are caused to perform the sensing or touching of their associated storage studs 13. In distinction to the previously described cases, this process is effected immediately because in this case the connecting lever 21 is not being hindered by the locking lever 32, and the circuit of the locking magnet SM remains unenergized in the case of these types of characters or signal elements on account of the non-actuated storage contact S*v*8.

Since the setting shaft 7 for the purpose of increasing the input speed, rotates at a somewhat higher speed than the transmitter shaft 24, the storage unit ST, at an uninterrupted keying at the highest possible rate of speed, will be filled slowly, in the course of which, and in accordance with what has been described hereinbefore, each row of storage studs always receives the code combination associated with the respectively actuated key and to which, when changing from one case or type group to the other, there is still automatically added the associated case identification in the manner still to be described in detail hereinafter. If now the case happens that the storage drum ST is no longer capable of receiving further characters or signal elements because the touching device AE, which is dependent upon the transmitter speed, was unable to sense or touch a sufficient number of stored characters or signal elements during the available period of time, then the touching device, on account of being continuously coupled via the storage drum ST, will finally assume a position in which the locking member 18, via a mechanism for locking the keyboard TS which is only schematically shown in FIG. 1, will act upon the keyboard unit T*a* for blocking the latter for such a period of time until, on account of the continuously running touching device, the storage drum ST is again capable of receiving new characters or signal elements.

Since the storage studs 13, which are displaceably arranged in the storage drum 12, have to be reset to normal prior to every new setting, a cam 40 (FIG. 1) having a hump-like profile is arranged on the hollow shaft 17 in the direction of rotation directly behind the storage contacts, with this cam extending substantially throughout the entire width of the internal drum, via which the storage studs 13 are again pressed out in a row-wise fashion subsequently to the performed interrogation.

Figure 3:
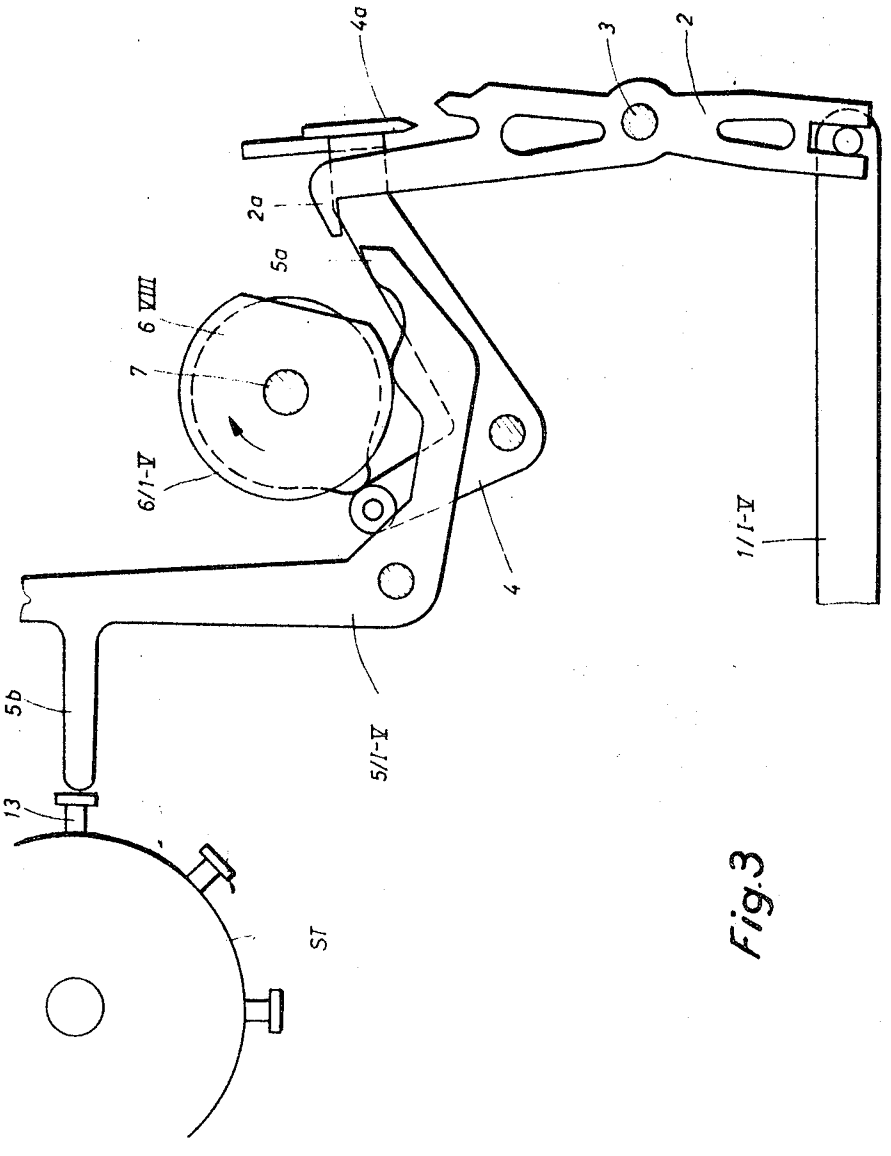
FIG. 3 shows in a detailed representation the transfer mechanism between the code bars and the storage drum.
Figure 4:
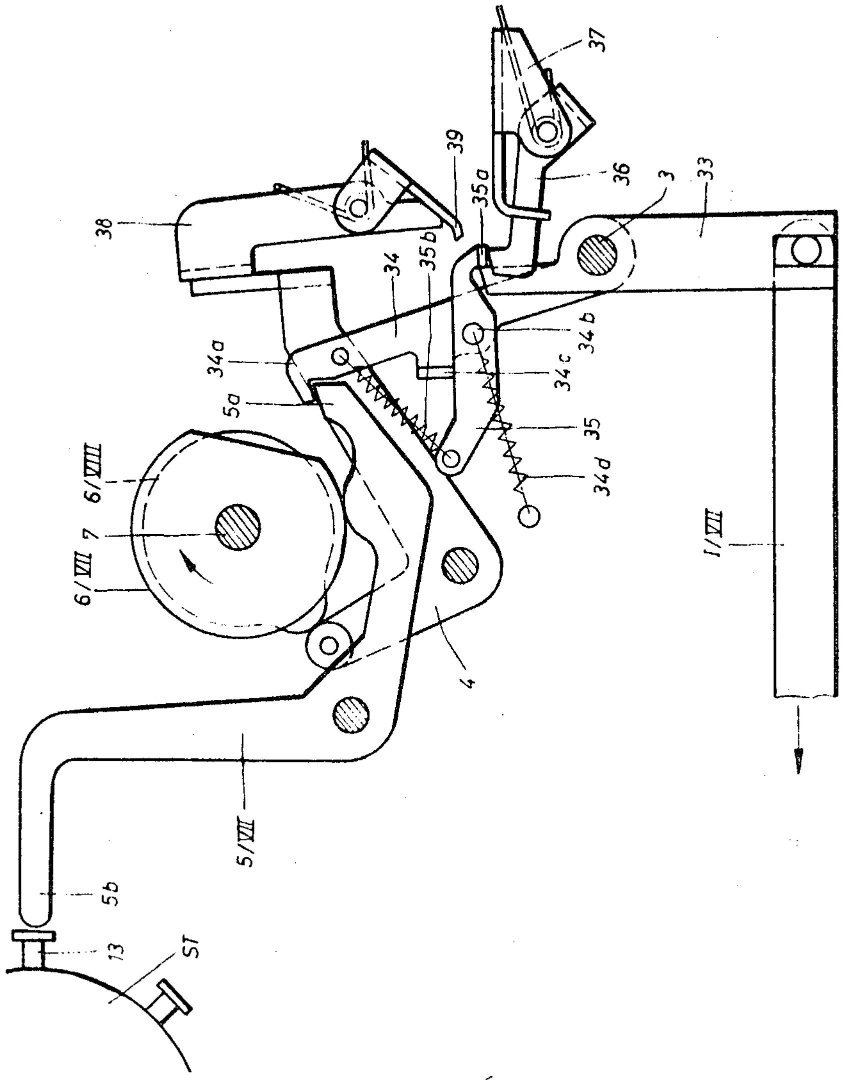
FIG. 4 shows in a detailed representation the transfer mechanism between the case shift bars and the storage drum.

In order that the code combination, which is respectively set as a result of actuating the keys, via the code bars, can be fed into the storage drum ST, transfer mechanisms are provided in accordance with the showing of FIGS. 3 and 4, which are controlled via the setting cam set 6. The control mechanism for the setting levers 5/VI and VII (FIG. 4) provided for inserting the case identification differs from that of the setting levers 5/I to V associated with the combination elements, because for the two first mentioned setting levers there will have to be satisfied the requirement resulting from the above, and according to which the corresponding identification is being stored-in together with the character or signal element only when changing the case (type group).

The control mechanism, as shown in FIG. 3, and which is the same for all setting levers 5/I to V is designed in accordance with a construction of the type known per se. In the course of this the code combination as set by way of actuating the keys, via the code bars 1/I to V, is transferred to the code levers 2 which, turning about their stationary axis 3, and quite depending on the code bar setting, either place themselves with their snug **2*a* in front of the associated touch arm 5*a* of the corresponding setting lever 5/I to V, or release the latter in accordance wtih the representation. As already mentioned hereinbefore, the setting clutch 8 (FIG. 1) is tripped upon every actuation of the keys, so that the setting cam set 6 starts to perform one revolution in the direction as indicated by the arrow. In the course of this, and via the keyboard locking cam 6/VIII, there is first of all released the bolt lever 4 which is under the action of a not shown spring and which, with its bolt edge 4*a*, engages the correspondingly designed code levers 2 for locking them in the previously selected position. In this way also the keyboard unit, on account of the form-locking connection between the code levers and the code bars, is locked for a period of time corresponding to the time of rotation of the setting cam set 6. Now the setting levers 5/I to V, which are thereafter all released at the same time by the correspondingly aligned flattened portions of the setting cams 6/I to V, try to follow the shape of the setting cams by being under the action of not shown springs, and by turning in the anticlockwise fashion, thus sensing the setting of the code levers 2 in the course of this. Since quite depending on the stored combination either the one or the other setting lever 5, by the application of its touch arm 5*a* to the snug 2*a* of the associated code lever 2, is prevented from engaging completely, the remaining setting levers 5 are not being hindered so that they, on account of the swivel movement effected with the aid of their setting arm 5*b*, will effect the pressing-in of the storage stud 13 which is respectively positioned opposite them, into the storage drum ST. In this way the code combination as set via the code bars 1/I to V, is stored into the storage unit ST. In the course of the further rotation of the setting cam set 6 all of the setting levers 5** are again moved for being reset to normal, in the course of which, and shortly before terminating one complete revolution also the keyboard unit T*a* is being unlocked again.

For the purpose of effecting the sensing of the answer-back unit N*a* (FIG. 1), the setting levers 5/I to V are still provided with a touch arm corresponding to the setting arm **5*b* and which is positioned in continuation of the vertical lever arm as indicated by the fracture line, each time above the setting arm 5*b***.

The insertion of the case shift identification is effected via the control mechanism, as shown in FIG. 4, which, by being assigned to the two generally used cases or type groups "letters" and "figures," is provided twice, and which act upon the storage studs 13 associated with the storage contacts S*v*6 and S*v*8. The mechanism as shown in FIG. 4 is the one with the aid of which there is inserted the identification of the case shift signal "letters." The mechanism which is assigned to the case shift signal "figures," or which is associated with the respective code bar 1/VI is arranged ahead of the shown one, and is not to be seen therefore in the copending drawing.

In the shown representation it is started out from the normal condition in which the case shift bar "letters" 1/VII was compulsory moved into its right-hand end position on account of the inserted case shift identification "figures." The part corresponding to the code levers 2 of FIG. 3, consists of two separate levers 33 and 34 which are pivoted on the axis 3 and which, in the shown position, are coupled to one another via a locking pawl 35 which is rotatably mounted to the upper lever part 34. The locking pawl 35 is being acted upon by a spring **35*b* which retains the pawl in its normal position, in a limiting stop position resting against a rectangularly bent projection or extension 34*c* of the upper lever part 34. Moreover, the pivot pin 34*b* of the locking pawl 35 is being acted upon by a spring 34*d* which tends to pull the upper lever part 34 into the shown position in which the snug 34*a* projects into the range of movement of the touch arm 5*a* of the setting lever 5/VII. Furthermore there is provided a holding pawl 36 which is stationarily pivoted in the guide member 37, with this holding pawl coming into engagement with the locking pawl 35 in a manner to be described in detail hereinafter. For the purpose of eliminating this holding condition the bolt lever 4 instead of the bolt edge 4*a* is provided with a pawl carrier 38 within the range of the two case shift mechanisms, with a resiliently pivoted release pawl 39 being arranged at the lower end of said pawl carrier 38**.

Upon effecting the input of a character or signal element forming part of the letters group, the case shift bar "letters" 1/VII is automatically moved towards the left in the direction as indicated by the arrow, whereas at the same time the not shown bar "figures" 1/VI is being shifted into the right-hand end position. Via the bar 1/VII the lower lever part 33 is swivelled towards the left thus causing the upper lever part 34, via the locking pawl 35, to be disengaged from the touch arm 5a of the setting lever 5/VII. On account of the swivel movement of the lever 33 (lower lever part), that locking pawl 35 has been pulled so far to the right that the holding pawl 36 which, prior thereto, was pressed downwards by the action of the bolt snug 35a can engage behind the snug of the locking pawl 35, so that the upper lever part 34 will be fixed in the lifted position, and the lower lever part 33 will become relieved.

Upon commencement of the already described controlling of the touching operation, the bolt lever 4 is released by the keyboard locking cam 6/VIII and is caused to swivel in the clockwise direction. On account of this the release pawl 39 is lowered or moved downwards. In the course of this it slides resiliently along the front side of the bolt snug 35a for engaging finally by gripping below said snug. The release pawl 39 remains in this position until shortly before termination of the rotation of the setting cam set 6. Since the setting lever 5/VII is released, it is capable of being engaged by the setting cam 6/VII associated with the corresponding case shift pair 1/VII, thus allowing it to actuate its associated storage stud 13 in the storage unit ST.

Shortly before the beginning of the rotation the bolt lever 4 is again swivelled into its normal position. In the course of this the release pawl 39 is lifted thus causing the locking pawl 35 to be disengaged from the holding pawl 36, so that the upper lever part 34, under the action of its spring 34d, is reset to normal, in which position the setting lever 5/VII is being blocked by the action of the snug 34a. Since the bar 1/VI and, consequently, the lower lever part 33, are still in the position as swivelled to the left, the locking pawl 35 with its bolt snug 35a will come to lie on the lower lever part 33. No sooner than after the lower lever part 33 has been moved back into the shown position in the course of a key-controlled displacement of the code bar 1/VII, the locking pawl 35 will again engage the space behind the upper extension of the lower part 33.

Since such a displacement of the code bar 1/VII, however, is only effected again upon feeding-in a character or signal element associated to the case or type group "figures," the shown control mechanism will remain in the previously described position with respect to all subsequently following characters or signal elements forming part of the "figures" group. In this way it is safeguarded that no further type group or case shift identification will be stored-in together with the subsequently following characters or signal elements of the same group.

As already mentioned hereinbefore, the control mechanism which is provided for inserting the case or type group identification "figures," as regards both the construction and the mode of operation, is the same as that shown in FIG. 4. Merely the rectangularly bent extension 34c is designed somewhat different, in order to achieve that in the case of the type group or case shift identification "figures," the storage studs 13, which are associated with the storage contacts Sv6 and Sv8, are reliably being pressed-in. For this reason the extension 34c of the other lever part 34 (not shown) is so designed that it, during the swivel motion of this lever part, will cause the lever 34, as shown in FIG. 4, to be taken along, so that both setting levers 5/VI and 5/VII are released for effecting a corresponding storage marking. The locking pawls 35 which, in the course of this, both come into engagement with their holding pawls 36, are lifted off in common at the end of the setting cam rotation, in the manner described hereinbefore, by the action of the release pawl 39, with the shown pawl 35 returning to the shown position, whereas the other one, as described, will come to lie on the associated lower lever part 33.

In order to be sure that, at the beginning of each transmission process, the first signal which is required for synchronising the two corresponding machines, is a case shift signal, it is necessary for the two non-rigidly coupled case shift bars. 1/VI and 1/VII, to be moved into the shown position (FIG. 4) prior to the beginning of the transmission operation; out of this position, and together with the first signal, there is either stored the one or the other case identification. This may be effected by the manual actuation of a special key or with the aid of e.g. a time-dependent automatic control arrangement.

Besides the key-controlled transmission and the answer-back code transmission, which are both effected via the storage device, it is still possible in the case of printing telegraph apparatus (teleprinters) to perform a tape-controlled operation.

According to the showings of FIGS. 1 and 5 there is only concerned a tape sensing attachment LA which is driven or operated via a stepped-down toothed-wheel gearing, by the setting shaft 7 operating at transmitter speed, and which is capable of controlling directly the transmitter clutch 25. The tape sensing contacts Lv1 to Lv5, which are arranged in series with both the storage contacts Sv1 to Sv6 and the transmitting contacts Sk1 to Sk5, are designed as make-and-break (two way) contacts and, when at normal, assume the position as shown in FIG. 5, from which they only change into the mid-way or opposite position, i.e. against the other contact lamination, during a tape sensing operation. Since care has been taken that either only a tape-controlled operation or a storage operation is possible in which the respective other V-contacts are closed, any mutual interference is reliably prevented.

What is claimed is:

1. A storage device having a storage capacity which is independent of the number of automatically inserted case shift signals, comprising a storage drum provided with paraxial rows of storage studs which are adjustable in the radial direction and serve the storing-in of the code signals, said drum being rotatable in a step-by-step manner in the rhythm of the input, a touching device which is moved in the opposite direction and in the rhythm of a transmitter, such that the touching device has a plurality of storage contacts (Sv1 to Sv5) which are arranged in series with a plurality of transmitting contacts (Sk1 to Sk5) and which, in alignment to said storage studs are arranged inside said storage drum and in a manner rotatable about the center axis thereof, said transmitter-controlled rearward rotation of the touching device being effected each time in two partial steps of a half drum stepping division, such that the first partial rotation is performed during the transmission of the start element, while the second partial rotation is performed during the transmission of the stop element.

2. A storage device according to claim 1, in which each row of storage studs includes additional storage studs by which a case shift identification is stored and a pair of associated storage contacts (Sv6 and Sv8) which are advancingly staggered by half a stepping division of said storage drum with respect to the other storage contacts (Sv1 to Sv5), and in the event of an actuation have an influencing effect upon the touching process and upon the storage contacts (Sv1 to Sv5) in a way effecting the setting of the case shift signal.

3. A storage device according to claim 2, wherein said storage contact (Sv6) is arranged in series with a storage contact (Sv3).

4. A storage device according to claim 3, in which said storage contacts (Sv1 to Sv6) are designed as normally closed contacts, and that the storage contact (Sv8) is designed as a normally open contact.

5. A storage device according to claim 2, wherein in the respective starting position for sensing a new row of storage studs, the storage contacts (Sv6 and Sv8) are positioned opposite their associated storage studs, so that by the first partial rotation the other storage contacts (Sv1 to Sv5) are brought into an opposite position in relation to the storage studs of this row, and that by the second partial rotation of the previous relative position of the storage contacts to another row of storage studs is reestablished.

6. A storage device according to claim 2, in which the actuation of the storage contact (Sv8) by a storage stud causes a locking device to become effective prior to the respective tripping of a transmitter cam set, preventing the touching device from being rotated during the subsequently following transmission process, that in this case there is transmitted the case shift signal as previously set by the storage contacts (Sv1 to Sv6) that towards the end of this transmission process the said locking device is again rendered ineffective, and that this operation, initiated by a partial rotation of the touching device, is immediately followed by the transmission of the signal which has now been sensed by the storage contacts (Sv1 to Sv5) by the said storage studs.

7. A storage device according to claim 1, wherein the partial stepping device forming part of the touching device consists of a toothed wheel rim with axially arranged teeth forming part of the storage drum with a trip seesaw associated with the touching device being in engagement therewith, such that with each tilting movement of said seesaw, the touching device is released to perform a rearward rotary movement corresponding to the half drum stepping division, which it performs immediately under the effect of a correspondingly large torque.

8. A storage device according to claim 7, in which said torque is transferred by a friction clutch from a continuously rotating drive to said touching device.

9. A storage device according to claim 1 wherein said storage drum unit is being stepped-on by a Maltese cross transmission which is driven by a setting device.

10. A storage device according to claim 1, in which together with the first stepping-on of said storage drum, a transmitter clutch is released at said touching device by a locking member, and a resetting lever of the transmitter clutch, is returned into the resetting position by the action of the locking member after the touching device, at the beginning of the transmission of the last signal stored in said storage drum, has performed its first partial rotation.

11. A storage device according to claim 7, wherein said trip seesaw is actuated by means of intermediate members, with the aid of a camplate forming part of the transmitter cam set, such that it always reassumes its normal position at the end of each revolution of said transmitter cam set.

12. A storage device according to claim 6, in which upon closing of said storage contact (Sv8) there is also actuated a stepping magnet forming part of said locking device, for bringing a locking lever into a position in which the trip seesaw is prevented from being tilted, so that upon actuation of a further contact (Sk8), controlled by transmitter cam set, and in the case of a closed storage contact (Sv8), the said stepping magnet is again actuated to cause said locking lever to again reset to normal.

13. A storage device according to claim 12, wherein said contacts (Sv8 and Sk8) are arranged in series with the coil of said stepping magnet, and that said contact (Sk8) is opened during the time of rotation of said transmitter cam set.

14. A storage device according to claim 1, in which the storing-in of the combination as set by way of key depression, and of the case shift identification into said storage drum, is effected by a setting device.

15. A storage device according to claim 14, in which said setting device consists of a setting cam set and setting levers (5/I to VII) controlled thereby, which serve to sense the setting of the code levers (2, 33/34) as set by the code bars (1/I to V) and the case shift bars (1/VI and VII) and, by correspondingly actuating the storage studs serve to store this setting into the said storage drum.

16. A storage device according to claim 15, in which the code levers, as controlled by the case shift bars (1/VI and VII), consist of two separate lever parts (33 and 34) which only in a predetermined position of the associated bar (1/VI or 1/VII) come into a force-locking connection with one another by a locking pawl, from this position the respective bar (1/VI or 1/VII) causes a releasing of the associated setting lever (5/VI or 5/VII) for effecting the storing-in of a case shift identification, and that subsequently to the effected storing-in, the existing connection between the two lever parts (33 and 34) is interrupted by the lifting of said pawl.

17. A storage device according to claim 16, wherein for the purpose of identifying the case shift signal "letters" there is only released the setting lever (5/VII), and that for the purpose of identifying the case shift signal "figures," the setting lever (5/VI) is released in addition thereto.

18. A storage device according to claim 17, wherein said lever part (34) which is associated with the setting lever (5/VI), is so designed that it, in the course of a swivel movement releasing the setting lever (5/VI), will at the same time lift the lever part (34) which is associated with said setting lever (5/VII).

19. A storage device according to claim 1, in which said storage contacts (Sv1 to Sv6 and Sv8) are arranged in an insulated manner on a hollow shaft, and the connecting lines extending to the contacts are led through the hollow space of the shaft.

20. A storage device according to claim 19, wherein for the purpose of resetting said storage studs, the shaft is provided with a cam extending substantially the inside length of said storage drum, with said cam having a hump-like profile and being arranged in the touching direction closely behind said storage contacts (Sv1 to Sv6 and Sv8).

References Cited

UNITED STATES PATENTS

| | | | |
|---|---|---|---|
| 1,576,167 | 3/1926 | Wheeler et al. | 178—17.5 |
| 1,582,341 | 4/1926 | Miniotti | 178—17.5 |
| 2,781,415 | 2/1957 | De Boo | 178—17 |
| 2,903,106 | 9/1959 | Mason | 178—17 |

FOREIGN PATENTS

| | | |
|---|---|---|
| 305,075 | 8/1927 | Great Britain. |
| 704,594 | 2/1954 | Great Britain. |

THOMAS A. ROBINSON, Primary Examiner

M. M. CURTIS, Assistant Examiner

U.S. Cl. X.R.

178—17, 26